(12) United States Patent
Chen et al.

(10) Patent No.: US 12,219,125 B2
(45) Date of Patent: Feb. 4, 2025

(54) CONSTRAINED MOTION VECTOR DERIVATION FOR LONG-TERM REFERENCE PICTURES IN VIDEO CODING

(71) Applicant: BEIJING DAJIA INTERNET INFORMATION TECHNOLOGY CO., LTD., Beijing (CN)

(72) Inventors: Yi-Wen Chen, San Diego, CA (US); Xiaoyu Xiu, San Diego, CA (US); Xianglin Wang, San Diego, CA (US); Tsung-Chuan Ma, San Diego, CA (US)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 568 days.

(21) Appl. No.: 17/402,466

(22) Filed: Aug. 13, 2021

(65) Prior Publication Data

US 2021/0377520 A1    Dec. 2, 2021

Related U.S. Application Data

(63) Continuation of application No. PCT/US2020/018918, filed on Feb. 19, 2020.
(Continued)

(51) Int. Cl.
*H04N 19/105* (2014.01)
*H04N 19/159* (2014.01)
(Continued)

(52) U.S. Cl.
CPC ......... *H04N 19/105* (2014.11); *H04N 19/159* (2014.11); *H04N 19/176* (2014.11); *H04N 19/513* (2014.11); *H04N 19/577* (2014.11)

(58) Field of Classification Search
CPC .. H04N 19/105; H04N 19/159; H04N 19/176; H04N 19/513; H04N 19/577
(Continued)

(56) References Cited

U.S. PATENT DOCUMENTS 10,785,486 B2 * 9/2020 Li ........................ H04N 19/70
2003/0206589 A1    11/2003 Jeon
(Continued)

FOREIGN PATENT DOCUMENTS

CN    1518833 A    8/2004
CN   102907100 A    1/2013
(Continued)

OTHER PUBLICATIONS

Li et al. "CE11: Results on Composite Reference Picture," Jul. 2018 (Year: 2018).*
(Continued)

*Primary Examiner* — Matthew David Kim
(74) *Attorney, Agent, or Firm* — Arch & Lake LLP (57) ABSTRACT

A method of constraining the operations of certain inter-mode coding tools in the derivation of motion vector candidates for inter-mode coded blocks employed in video coding standards, such as the now-current Versatile Video Coding (VVC), is performed at a computing device. The computing device determines whether one or more of the reference pictures associated with an inter-mode coded block involved in an operation of an inter-mode coding tool are long-term reference pictures, and constrains the operation of the inter-mode coding tool on the inter-mode coded block based on the determination.

9 Claims, 5 Drawing Sheets

Related U.S. Application Data (60) Provisional application No. 62/808,271, filed on Feb. 20, 2019.

(51) Int. Cl.
*H04N 19/176* (2014.01)
*H04N 19/513* (2014.01)
*H04N 19/577* (2014.01)

(58) Field of Classification Search
USPC .................................................. 375/240.15
See application file for complete search history.

(56) References Cited

U.S. PATENT DOCUMENTS

| | | | | |
|---|---|---|---|---|
| 2004/0146109 | A1* | 7/2004 | Kondo | H04N 19/573 375/240.24 |
| 2005/0129117 | A1* | 6/2005 | Jeon | H04N 19/58 375/E7.257 |
| 2007/0223575 | A1 | 9/2007 | Wang et al. | |
| 2010/0091845 | A1 | 4/2010 | Jeon et al. | |
| 2013/0107963 | A1* | 5/2013 | Wahadaniah | H04N 19/513 375/E7.125 |
| 2013/0107965 | A1 | 5/2013 | Wahadaniah et al. | |
| 2013/0343459 | A1 | 12/2013 | Bici et al. | |
| 2014/0362910 | A1 | 12/2014 | Seregin et al. | |
| 2015/0139321 | A1* | 5/2015 | Kim | H04N 19/61 375/240.15 |
| 2015/0195558 | A1* | 7/2015 | Kim | H04N 19/58 375/240.16 |
| 2016/0050424 | A1* | 2/2016 | Choi | H04N 19/172 375/240.12 |
| 2016/0057420 | A1 | 2/2016 | Pang et al. | |
| 2017/0214938 | A1* | 7/2017 | Zhang | H04N 19/177 |
| 2018/0167610 | A1 | 6/2018 | Park et al. | |
| 2018/0199057 | A1 | 7/2018 | Chuang et al. | |
| 2018/0278949 | A1 | 9/2018 | Karczewicz et al. | |
| 2018/0316930 | A1 | 11/2018 | Takahashi et al. | |
| 2018/0316933 | A1 | 11/2018 | Wahadaniah et al. | |
| 2019/0020891 | A1* | 1/2019 | Kondo | H04N 19/16 |
| 2020/0216026 | A1* | 7/2020 | Price | G08B 13/19647 |
| 2020/0244979 | A1* | 7/2020 | Li | H04N 19/159 |
| 2021/0144392 | A1* | 5/2021 | Zhang | H04N 19/107 |
| 2021/0243476 | A1* | 8/2021 | Ko | H04N 19/159 |
| 2021/0274212 | A1* | 9/2021 | Liu | H04N 19/184 |
| 2022/0086475 | A1* | 3/2022 | Jang | H04N 19/174 |

FOREIGN PATENT DOCUMENTS

| | | |
|---|---|---|
| CN | 104170381 A | 11/2014 |
| CN | 104488272 A | 4/2015 |
| CN | 105493505 A | 4/2016 |
| CN | 106797476 A | 5/2017 |
| CN | 108259915 A | 7/2018 |
| CN | 108293131 A | 7/2018 |
| JP | 2016521486 A | 7/2016 |
| KR | 1020180038371 A | 4/2018 |

OTHER PUBLICATIONS

International Search Report of PCT Application No. PCT/US2020/018918 dated Jun. 23, 2020, (3p).

Sjoberg, Rickard et al., "Overview of HEVC High-Level Syntax and Reference Picture Management", IEEE (14p).

Chen, Jianle, Algorithm Description for Versatile Video Coding and Test Model 4 (VTM 4), Output Document of JVET, Joing Video Experts Team (JVET) of ITU-T SG 16 WP 3 and ISO/IEC JTC 1/SC 29/WG 11, JVET-M1002-v2, 13th Meeting: Marrakech, MA Jan. 9-18, 2019, (62p).

Bross, Benjamin et al., "Versatile Video Coding (Draft 4)", Output document approved by JVET, Joint Video Experts Team (JVET) of ITU-T SG 16 WP 3 and ISO/IEC JTC 1/SC 29/WG11, JVET-M1001-v3, 13th Meeting: Marrakech, MA, Jan. 9-18, 2019, (252p).

Bross, Benjamin et al., "Versatile Video Coding (Draft 3)", Output document approved by JVET, Joint Video Experts Team (JVET) of ITU-T SG 16 WP 3 and ISO/IEC JTC 1/SC 29/WG11, JVET-L1001-v7, 12th Meeting: Macao, China, Oct. 3-12, 2018, (223p).

Chen, Yi-Wen, et al., "Non-CE4:MVD Scaling Issue for LTRPs", Input document to JVET, Joint Video Experts Team (JVET) of ITU-T SG 16 WP 3 and ISO/IEC JTC 1/SC 29/WG 11, JVET-N0332, 14th Meeting: Geneva, CH, Mar. 19-27, 2019, (7p).

Li, Weiran et al., CE11: Results on composite reference picture (test 11.1.1, 11.1.2, 11.1.3, 11.1.4, 11.2.1 and 11.2.2), Input Document to JVET, Joint Video Experts Team (JVET) of ITU-T SG 16 WP 3 and ISO/IEC JTC 1/SC 29/WG 11, JVET-K0156-v1, 11th Meeting: Ljubljana, SI, Jul. 10-18, 2018, (9p).

Zheng, Xiaozhen et al., "CE11: Summary report on composite reference pictures", Joint Video Experts Team (JVET) of ITU-T SG 16 WP 3 and ISO/IEC JTC 1/SC 29/WG11, JVET-K0031-v2, 11th Meeting: Ljubljana, SI, Jul. 10-18, 2018, (7p).

Jianle Chen, et al., "Algorithm Description of Joint Exploration Test Model 7 (JEM 7)", Document: JVET-G1001-v1, [online], JVET-G1001 (version 1), Joint Video Exploration Team (JVET) of ITU-T SG 16 WP 3 and ISO/IEC JTC 1/SC 29/WG 11, Aug. 19, 2017, pp. 12, 13,23-27, <URL: http://phenix.it-sudparis.eu/jvet/doc_end_user/current_document.php?id=3286> and <URL: http://phenix.it-sudparis.eu/jvet/doc_end_user/documents/7_Torino/wg11/JVET-G1001-v1.zip>. (xp).

Wang, Ye-kui et al., On rWANG, Ye-kui et al., On reference picture management for VVC, Joint Video Experts Team (JVET) of ITU-T SG 16 WP 3 and ISO/IEC JTC 1/SC 29/WG 11 13th Meeting , Document: M0128-v1eference picture management for VVC, Joint Video Experts Team (JVET) of ITU-T SG 16 WP 3 and ISO/IEC JTC 1/SC 29/WG 11 13th Meeting , Document: M0128-v1, (xp).

* cited by examiner

CONSTRAINED MOTION VECTOR DERIVATION FOR LONG-TERM REFERENCE PICTURES IN VIDEO CODING

CROSS-REFERENCE TO RELATED APPLICATIONS

This application is a continuation of PCT Application PCT/US2020/018918 filed Feb. 19, 2020, which is based on and claims the benefit to U.S. provisional patent application Ser. No. 62/808,271 filed on Feb. 20, 2019. The entire disclosure of the aforementioned application is incorporated herein by reference in its entirety.

FIELD

The present disclosure relates generally to video coding and compression. More specifically, this disclosure relates to systems and methods for performing video coding using constraints on motion vector derivation for long-term reference pictures.

BACKGROUND

This section provides background information related to the present disclosure. The information contained within this section should not necessarily be construed as prior art.

Any of various video coding techniques may be used to compress video data. Video coding can be performed according to one or more video coding standards. Some illustrative video coding standards include versatile video coding (VVC), joint exploration test model (JEM) coding, high-efficiency video coding (H.265/HEVC), advanced video coding (H.264/AVC), and moving picture experts group (MPEG) coding.

Video coding generally utilizes predictive methods (e.g., inter-prediction, intra-prediction, or the like) that take advantage of redundancy inherent in video images or sequences. One goal of video coding techniques is to compress video data into a form that uses a lower bit rate, while avoiding or minimizing degradations to video quality.

Predictive methods utilized in video coding typically include performing spatial (intra frame) prediction and/or temporal (inter frame) prediction to reduce or remove redundancy inherent in the video data, and are typically associated with block-based video coding.

In block-based video coding, the input video signal is processed block by block. For each block (also known as a coding unit (CU)), spatial prediction and/or temporal prediction may be performed.

Spatial prediction (also known as "intra prediction") uses pixels from the samples of already coded neighboring blocks (which are called reference samples) in the same video picture/slice to predict the current block. Spatial prediction reduces spatial redundancy inherent in the video signal.

Temporal prediction (also known as "inter prediction" or "motion compensated prediction") uses reconstructed pixels from the already coded video pictures to predict the current block. Temporal prediction reduces temporal redundancy inherent in the video signal. Temporal prediction signal for a given CU is usually signaled by one or more motion vectors (MVs) which indicate the amount and the direction of motion between the current CU and its temporal reference. Also, when multiple reference pictures are supported, one reference picture index is additionally sent, which is used to identify from which reference picture in the reference picture store the temporal prediction signal comes.

After spatial and/or temporal prediction, the mode decision block in the encoder chooses the best prediction mode, for example based on the rate-distortion optimization method. The prediction block is then subtracted from the current block; and the prediction residual is de-correlated using transform and quantized. The quantized residual coefficients are inverse-quantized and inverse-transformed to form the reconstructed residual, which is then added back to the prediction block to form the reconstructed signal of the block.

After spatial and/or temporal predictions, further in-loop filtering, such as deblocking filter, sample adaptive offset (SAO) and adaptive in-loop filter (ALF) may be applied on the reconstructed CU before it is put in the reference picture store and used to code future video blocks. To form the output video bit-stream, coding mode (inter or intra), prediction mode information, motion information, and quantized residual coefficients are all sent to the entropy coding unit to be further compressed and packed to form the bit-stream.

During the decoding process, the video bit-stream is first entropy decoded at entropy decoding unit. The coding mode and prediction information are sent to either the spatial prediction unit (when intra coded) or the temporal prediction unit (when inter coded) to form the prediction block. The residual transform coefficients are sent to inverse quantization unit and inverse transform unit to reconstruct the residual block. The prediction block and the residual block are then added together. The reconstructed block may further go through in-loop filtering before it is stored in reference picture store. The reconstructed video in reference picture store is then sent out to drive a display device, as well as used to predict future video blocks.

In video coding standards such as HEVC and VVC, the reference picture set (RPS) concept defines how previously decoded pictures are managed in a decoded picture buffer (DPB) in order to be used for reference, i.e., sample data prediction and motion vector prediction. In general, the RPS concept for reference picture management is to signal the status of the DPB in every slice (also known as "tile" in the current VVC).

Pictures in the DPB can be marked as "used for short-term reference," "used for long-term reference" or "unused for reference." Once a picture has been marked "unused for reference" it can no longer be used for prediction, and when it is no longer needed for output it can be removed from the DPB.

In general, the long-term reference picture is usually farther away from the current picture compared to the short-term reference picture in terms of display order (i.e. Picture Order Count or termed POC). This distinction between the long-term reference pictures and short-term reference pictures may affect some decoding processes such as motion vector scaling in the temporal and spatial MV prediction or implicit weighted prediction.

In video coding standards such as HEVC and VVC, when deriving spatial and/or temporal motion vector candidates, certain constraints are placed upon the scaling process which forms a part of derivation of the spatial and/or temporal motion vector candidates, based on whether certain reference pictures involved in the process are long-term reference pictures or not long-term reference pictures.

However, pursuant to video codec specifications such as the current VVC standardization, similar constraints have not been placed upon newer inter-mode video coding tools adopted in such video codec specifications for the derivation of motion vector candidates for inter-mode coded blocks.

SUMMARY

This section provides a general summary of the disclosure, and is not a comprehensive disclosure of its full scope or all of its features.

According to a first aspect of the present disclosure, a video coding method is performed at a computing device having one or more processors and memory storing a plurality of programs to be executed by the one or more processors. The method includes partitioning each picture in a video stream into a plurality of blocks or coding units (CUs). The method further includes performing inter-mode motion vector derivation on those blocks that are inter-mode coded. The method further includes operating certain inter-mode coding tools during the performance of inter-mode motion vector derivation on inter-mode coded blocks. The method further includes determining whether one or more of the reference pictures associated with an inter-mode coded block involved in an operation of an inter-mode coding tool are long-term reference pictures, and constraining the operation of the inter-mode coding tool on the inter-mode coded block based on the determination.

According to a second aspect of the present application, a computing device includes one or more processors, memory and a plurality of programs stored in the memory. The programs, when executed by the one or more processors, cause the computing device to perform operations as described above.

According to a third aspect of the present application, a non-transitory computer readable storage medium stores a plurality of programs for execution by a computing device having one or more processors. The programs, when executed by the one or more processors, cause the computing device to perform operations as described above.

BRIEF DESCRIPTION OF THE DRAWINGS

Hereinafter, sets of illustrative, non-limiting embodiments of the present disclosure will be described in conjunction with the accompanying drawings. Variations of structure, method, or functionality may be implemented by those of ordinary skill in the relevant art based on the examples presented herein, and such variations are all contained within the scope of the present disclosure. In cases where no conflict is present, the teachings of different embodiments may, but need not, be combined with one another.

DETAILED DESCRIPTION

The terms used in the present disclosure are directed to illustrating particular examples, rather than to limit the present disclosure. The singular forms "a" "an" and "the" as used in the present disclosure as well as the appended claims also refer to plural forms unless other meanings are definitely contained in the context. It should be appreciated that the term "and/or" as used herein refers to any or all possible combinations of one or more associated listed items.

It shall be understood that, although the terms "first," "second," "third," etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to," depending on the context.

Reference throughout this specification to "one embodiment," "an embodiment," "another embodiment," or the like in the singular or plural means that one or more particular features, structures, or characteristics described in connection with an embodiment are included in at least one embodiment of the present disclosure. Thus, the appearances of the phrases "in one embodiment" or "in an embodiment," "in another embodiment," or the like in the singular or plural in various places throughout this specification are not necessarily all referring to the same embodiment. Furthermore, the particular features, structures, or characteristics in one or more embodiments may be combined in any suitable manner.

Conceptually, many video coding standards are similar, including those previously mentioned in the Background section. For example, virtually all video coding standards use block-based processing, and share similar video coding block diagrams to achieve video compression.

Figure 1:
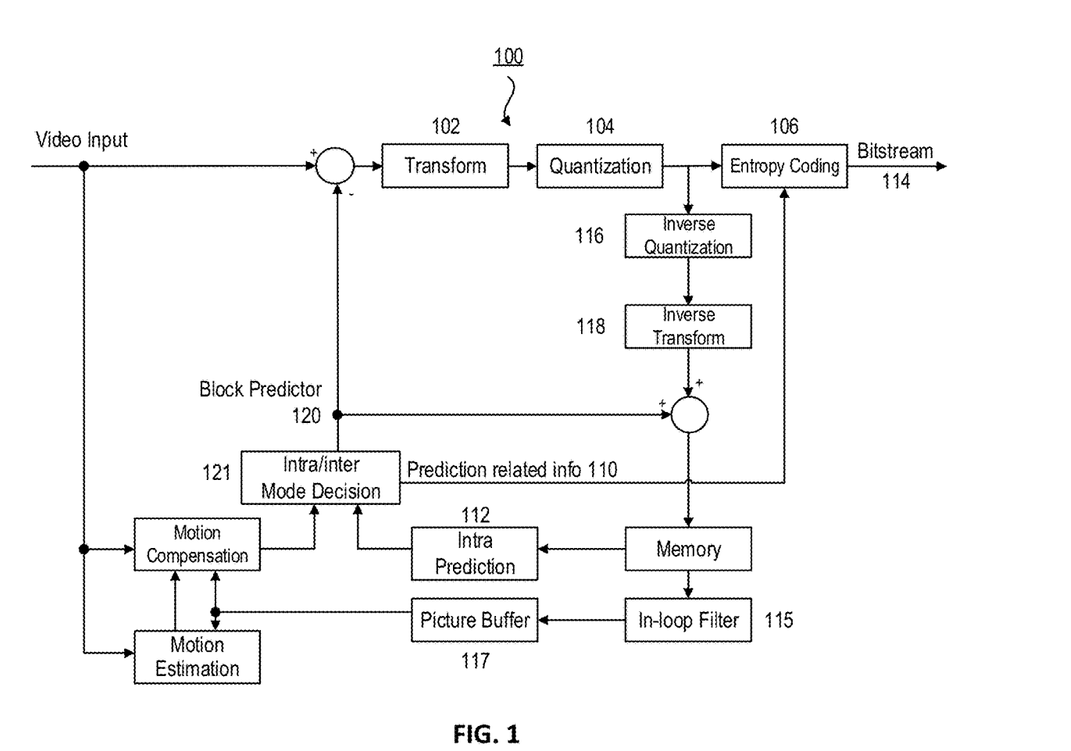
FIG. 1 is a block diagram setting forth an illustrative block-based hybrid video encoder which may be used in conjunction with many video coding standards.

FIG. 1 shows a block diagram of an illustrative block-based hybrid video encoder 100 which may be used in conjunction with many video coding standards. In the encoder 100, a video frame is partitioned into a plurality of video blocks for processing. For each given video block, a prediction is formed based on either an inter prediction approach or an intra prediction approach. In inter prediction, one or more predictors are formed through motion estimation and motion compensation, based on pixels from previously reconstructed frames. In intra prediction, predictors are formed based on reconstructed pixels in a current frame. Through mode decision, a best predictor may be chosen to predict a current block.

A prediction residual, representing the difference between a current video block and its predictor, is sent to a Transform circuitry 102. Transform coefficients are then sent from the Transform circuitry 102 to a Quantization circuitry 104 for entropy reduction. Quantized coefficients are then fed to an Entropy Coding circuitry 106 to generate a compressed video bitstream. As shown in FIG. 1, prediction-related information 110 from an inter prediction circuitry and/or an Intra Prediction circuitry 112, such as video block partition info, motion vectors, reference picture index, and intra prediction mode, are also fed through the Entropy Coding circuitry 106 and saved into a compressed video bitstream 114.

In the encoder 100, decoder-related circuitries are also needed in order to reconstruct pixels for the purpose of prediction. First, a prediction residual is reconstructed through an Inverse Quantization 116 and an Inverse Transform circuitry 118. This reconstructed prediction residual is combined with a Block Predictor 120 to generate un-filtered reconstructed pixels for a current video block.

To improve coding efficiency and visual quality, an in-loop filter is commonly used. For example, a deblocking filter is available in AVC, HEVC as well as the now-current version of VVC. In HEVC, an additional in-loop filter called SAO (sample adaptive offset) is defined to further improve coding efficiency. In the now-current version of the VVC standard, yet another in-loop filter called ALF (adaptive loop filter) is being actively investigated, and it has a good chance of being included in the final standard.

These in-loop filter operations are optional. Performing these operations helps to improve coding efficiency and visual quality. They may also be turned off as a decision rendered by the encoder 100 to save computational complexity.

It should be noted that intra prediction is usually based on unfiltered reconstructed pixels, while inter prediction is based on filtered reconstructed pixels if these filter options are turned on by the encoder 100.

Figure 2:
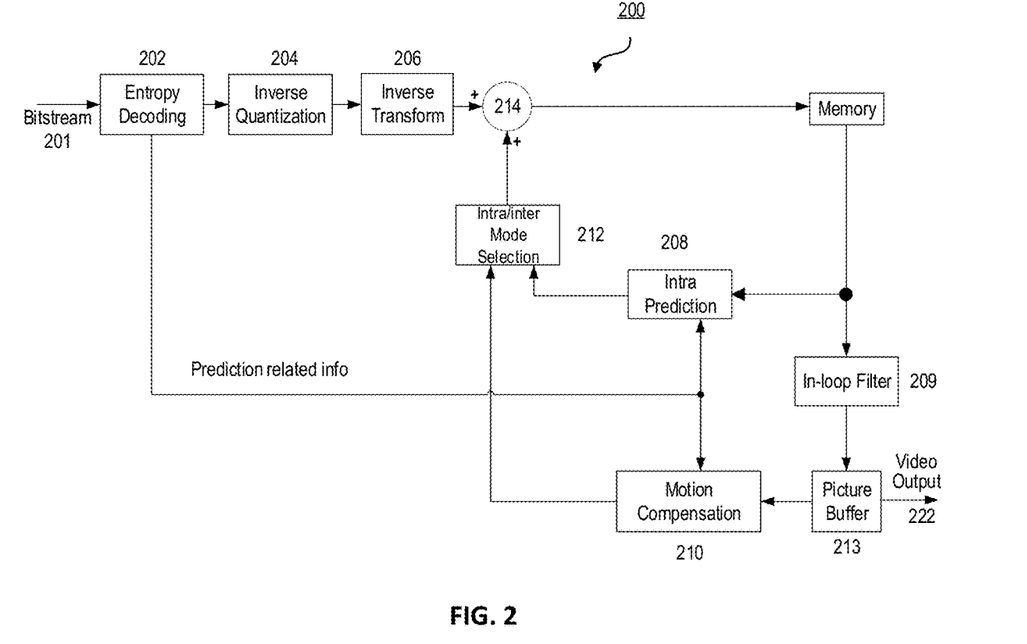
FIG. 2 is a block diagram setting forth an illustrative video decoder which may be used in conjunction with many video coding standards.

FIG. 2 is a block diagram setting forth an illustrative video decoder 200 which may be used in conjunction with many video coding standards. This decoder 200 is similar to the reconstruction-related section residing in the encoder 100 of FIG. 1. In the decoder 200 (FIG. 2), an incoming video bitstream 201 is first decoded through an Entropy Decoding 202 to derive quantized coefficient levels and prediction-related information. The quantized coefficient levels are then processed through an Inverse Quantization 204 and an Inverse Transform 206 to obtain a reconstructed prediction residual. A block predictor mechanism, implemented in an Intra/inter Mode Selector 212, is configured to perform either an Intra Prediction 208, or a Motion Compensation 210, based on decoded prediction information. A set of unfiltered reconstructed pixels are obtained by summing up the reconstructed prediction residual from the Inverse Transform 206 and a predictive output generated by the block predictor mechanism, using a Summer 214. In situations where an in-loop filter is turned on, a filtering operation is performed on these reconstructed pixels to derive the final reconstructed video. The reconstructed video in reference picture store is then sent out to drive a display device, as well as used to predict future video blocks.

In video coding standards such as HEVC, blocks may be partitioned based on quad-trees. In newer video coding standards such as the now-current VVC, more partition methods are employed, and one coding tree unit (CTU) may be split into CUs to adapt to varying local characteristics based on quad-tree, binary-tree or ternary-tree. The separation of CU, prediction unit (PU) and transform unit (TU) does not exist in most coding modes in the now-current VVC, and each CU is always used as the basic unit for both prediction and transform without further partitions. However, in some specific coding modes such as intra sub-partition coding mode, each CU may still contain multiple TUs. In the multi-type tree structure, one CTU is firstly partitioned by a quad-tree structure. Then, each quad-tree leaf node can be further partitioned by a binary and ternary tree structure.

Figure 3:
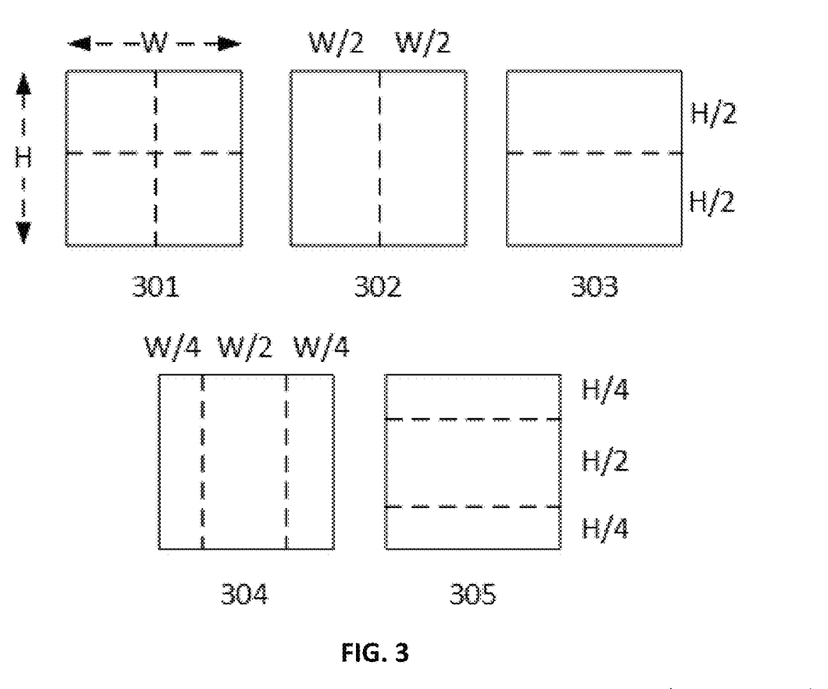
FIG. 3 is an illustration of block partitions in a multi-type tree structure which may be used in conjunction with many video coding standards.

FIG. 3 shows the five splitting types employed in the now-current VVC, namely, quaternary partitioning 301, horizontal binary partitioning 302, vertical binary partitioning 303, horizontal ternary partitioning 304, and vertical ternary partitioning 305.

In video coding standards such as HEVC and the now-current VVC, previously decoded pictures are managed in a decoded picture buffer (DPB) in order to be used for reference under the concept of reference picture set (RPS). Pictures in the DPB can be marked as "used for short-term reference," "used for long-term reference" or "unused for reference."

When the reference picture of the neighboring block is different from the given target reference picture for the current block, the scaled motion vectors of the spatial neighboring block may be used as motion vector predictor for the current block. In the scaling process for the spatial motion candidates, the scaling factor is calculated based on the picture order count (POC) distance between the current picture and the target reference picture, and the POC distance between the current picture and the reference picture for the neighboring block.

In video coding standards such as HEVC and the now-current VVC, certain constraints are placed upon the scaling process for the spatial motion candidates, based on whether certain reference pictures involved in the process are long-term reference pictures or not long-term reference pictures. When one of the two reference pictures is a long-term reference picture and the other one is not a long-term reference picture, the MV of the neighboring block is regarded as invalid. When both the two reference pictures are long-term reference pictures, the MVs of the spatial neighboring block is directly used as the MVP for the current block and the scaling processing is prohibited because the POC distance between the two long-term reference pictures are usually greater and thus the scaled MVs may be unreliable.

Similarly, in the scaling process for the temporal motion candidates, the scaling factor is calculated based on the POC distance between the current picture and the target reference picture, and the POC distance between the collocated picture and the reference picture for the temporal neighboring block (also known as collocated block).

In video coding standards such as HEVC and the now-current VVC, certain constraints are also placed upon the scaling process for the temporal motion candidates, based on whether certain reference pictures involved in the process are long-term reference pictures or not long-term reference pictures. When one of the two reference pictures is a long-term reference picture and the other one is not a long-term reference picture, the MV of the neighboring block is regarded as invalid. When both the two reference pictures are long-term reference pictures, the MVs of the temporal neighboring block is directly used as the MVP for the current block and the scaling processing is prohibited because the POC distance between the two long-term reference pictures are usually greater and thus the scaled MVs may be unreliable.

In newer video coding standards such as the now-current VVC, new inter-mode coding tools have been introduced, and some examples of the new inter-mode coding tools are: Bi-Directional Optical Flow (BDOF), Decoder-side Motion Vector Refinement (DMVR), Merge mode with MVD (MMVD), Symmetric MVD (SMVD), Bi-prediction with Weighted Averaging (BWA), pair-wise average merge candidates derivation, and Subblock-based Temporal Motion Vector Prediction (SbTMVP).

Conventional bi-prediction in video coding is a simple combination of two temporal prediction blocks obtained from the reference pictures that are already reconstructed. However, due to the limitation of the block-based motion compensation, there could be remaining small motion that can be observed between the samples of two prediction blocks, thus reducing the efficiency of motion compensated prediction. To solve this problem, BDOF is applied in the now-current VVC to lower the impacts of such motion for every sample inside one block.

Figure 4:
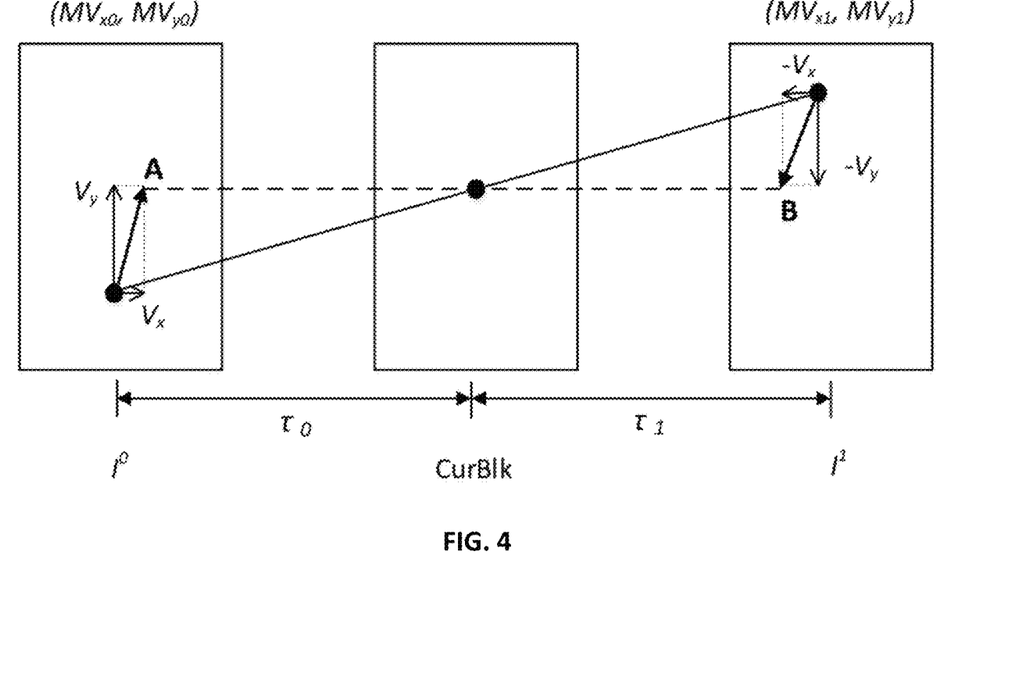
FIG. 4 is an illustration of the Bi-Directional Optical Flow (BDOF) process.

FIG. 4 is an illustration of the BDOF process. The BDOF is sample-wise motion refinement that is performed on top of the block-based motion-compensated predictions when bi-prediction is used. The motion refinement of each 4×4 sub-block is calculated by minimizing the difference between reference picture list 0 (L0) and reference picture list 1 (L1) prediction samples after the BDOF is applied inside one 6×6 window around the sub-block. Based on the motion refinement so derived, the final bi-prediction samples of the CU are calculated by interpolating the L0/L1 prediction samples along the motion trajectory based on the optical flow model.

DMVR is a bi-prediction technique for merge blocks with two initially signaled MVs that can be further refined by using bilateral matching prediction.

Figure 5:
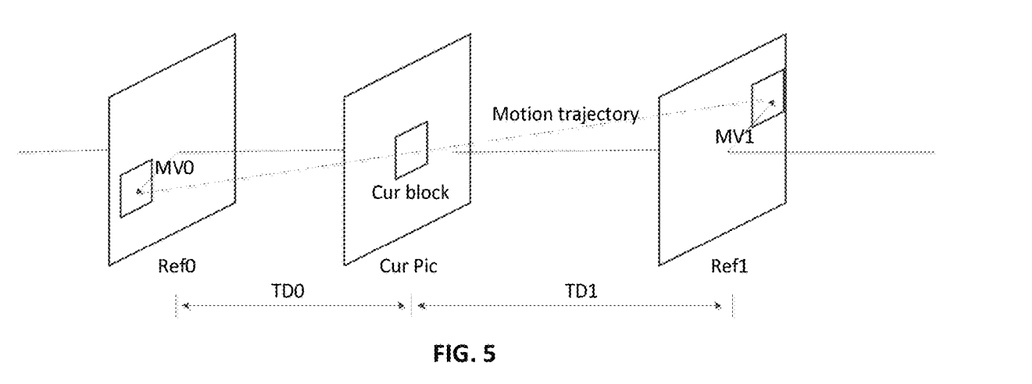
FIG. 5 is an illustration of bilateral matching used in Decoder-side Motion Vector Refinement (DMVR).

FIG. 5 is an illustration of bilateral matching used in DMVR. The bilateral matching is used to derive motion information of the current CU by finding the closest match between two blocks along the motion trajectory of the current CU in two different reference pictures. The cost function used in the matching process is row-subsampled sum of absolute difference (SAD). After the matching process is done, the refined MVs are used for motion compensation in the prediction stage, boundary strength calculation in deblock filter, temporal motion vector prediction for subsequent pictures and cross-CTU spatial motion vector prediction for subsequent CUs. Under the assumption of continuous motion trajectory, the motion vectors MV0 and MV1 pointing to the two reference blocks shall be proportional to the temporal distances, i.e., TD0 and TD1, between the current picture and the two reference pictures. As a special case, when the current picture is temporally between the two reference pictures and the temporal distance from the current picture to the two reference pictures is the same, the bilateral matching becomes mirror based bi-directional MV.

The now-current VVC introduced MMVD in addition to the existing merge mode. In the existing merge mode, the implicitly derived motion information is directly used for prediction sample generation of the current CU. In MMVD mode, after a merge candidate is selected, it is further refined by the signaled MVDs information.

A MMVD flag is signaled right after sending a skip flag and a merge flag to specify whether MMVD mode is used for a CU. The MMVD mode information includes a merge candidate flag, a distance index to specify motion magnitude, and a direction index for indication of motion direction.

In MMVD mode, only one of the first two candidates in the merge list is allowed to be selected as a starting MV, and the merge candidate flag is signaled to specify which one of the first two candidates is used.

Figure 6:
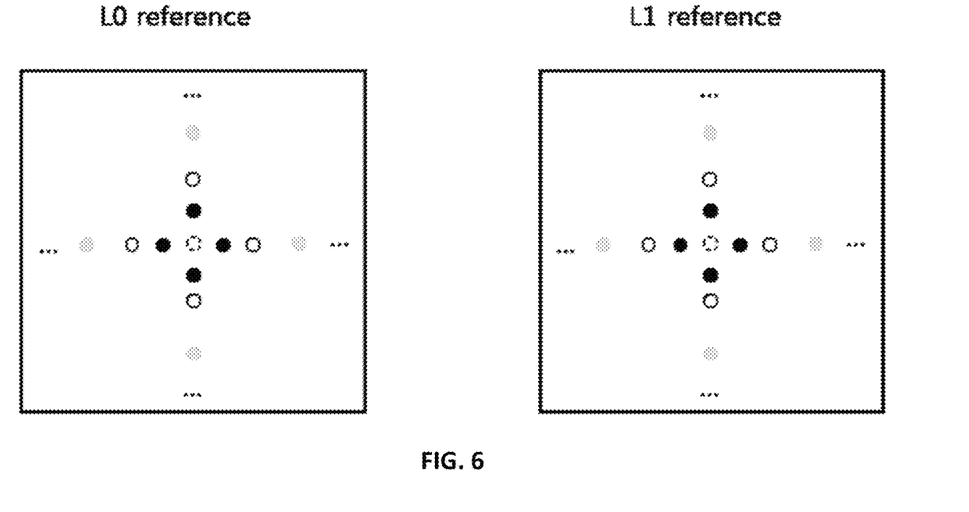
FIG. 6 is an illustration of search points used in Merge mode with Motion Vector Differences (MMVD).

FIG. 6 is an illustration of search points used in MMVD. An offset is added to either horizontal component or vertical component of the starting MV to derive the search points. The distance index specifies motion magnitude information and indicates a pre-defined offset from the starting point, and the direction index represents the direction of the offset relative to the starting point through a pre-defined mapping from direction indices to offset signs.

The meaning of the mapped offset sign could be variant according to the information of starting MVs. When the starting MV is a uni-prediction MV or a bi-prediction MV with their referred reference picture(s) pointing to the same side of the current picture (i.e. POCs of up to two reference pictures are both larger than the current picture POC, or are both smaller than the current picture POC), the mapped offset sign specifies the sign of MV offset added to the starting MV. When the starting MV is a bi-prediction MV with its two motion vectors pointing to different sides of the current picture (i.e. the POC of one reference picture is larger than the current picture POC, and the POC of the other reference picture is smaller than the current picture POC), the mapped offset sign specifies the sign of the MV offset added to the L0 motion vector of the starting MV and the opposite sign of the MV offset added to the L1 motion vector of the starting MV.

Both components of MV offsets are then derived from signaled MMVD distances and signs, and the final MVDs are further derived from the MV offset components.

The now-current VVC also introduced the SMVD mode. With the SMVD mode, motion information including reference picture indices of both L0 and L1 and MVD of L1 are not signaled but derived. In the encoder, SMVD motion estimation starts with initial MV evaluation. The set of initial MV candidates comprises of the MV obtained from uni-prediction search, the MV obtained from bi-prediction search and the MVs from the AMVP list. The initial MV candidate with the lowest rate-distortion cost is chosen to be the initial MV for the SMVD motion search.

The now-current VVC also introduced BWA. In HEVC, the bi-prediction signal is generated by averaging two prediction signals obtained from two reference pictures and/or using two motion vectors. In the now-current VVC, with BWA, the bi-prediction mode is extended beyond simple averaging to allow weighted averaging of the two prediction signals In the now-current VVC, five weights are allowed in the BWA. For each bi-predicted CU, the weight is determined in one of two ways. For a non-merge CU, the weight index is signaled after the motion vector difference, while for a merge CU, the weight index is inferred from neighbouring blocks based on the merge candidate index. Weighted averaging bi-prediction is only applied to CUs with 256 or more luma samples (i.e., CU width times CU height is greater than or equal to 256). For pictures without using backward prediction, all five weights are used. For pictures using backward prediction, only a pre-defined subset of three weights out of the five are used.

The now-current VVC also introduced pair-wise average merge candidates derivation. In pair-wise average merge candidates derivation, pairwise average candidates are generated by averaging predefined pairs of candidates in the existing merge candidate list. The averaged motion vectors are calculated separately for each reference list. When both motion vectors are available in one list, these two motion vectors are averaged even when they point to different reference pictures; when only one motion vector is available, this one motion vector is used directly; and when no motion vector is available, the list is kept invalid. When the merge list is not full after pair-wise average merge candidates are added, zero MVPs are inserted in the end until the maximum merge candidate number is encountered.

The current reference software codebase for the now-current VVC, known as VVC Test Model (VTM), also introduced the SbTMVP mode. Similarly to the temporal motion vector prediction (TMVP) in HEVC, SbTMVP uses the motion field in the collocated picture to improve motion vector prediction and merge mode for CUs in the current picture. The same collocated picture used by TMVP is used for SbTMVP. SbTMVP differs from TMVP in the following two main aspects: first, TMVP predicts motion at CU level but SbTMVP predicts motion at sub-CU level, and second, whereas TMVP fetches the temporal motion vectors from the collocated block in the collocated picture (the collocated block is the bottom-right or center block relative to the current CU), SbTMVP applies a motion shift before fetching the temporal motion information from the collocated picture, where the motion shift is obtained from the motion vector from one of the spatial neighboring blocks of the current CU.

Figure 7A:
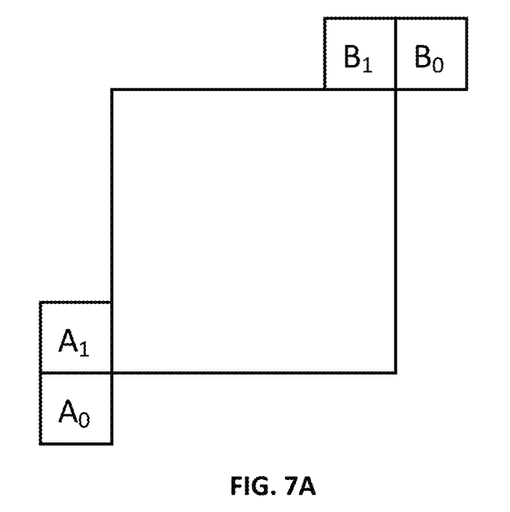
FIG. 7A is an illustration of the spatial neighboring blocks used in Subblock-based Temporal Motion Vector Prediction (SbTMVP) mode.
Figure 7B:
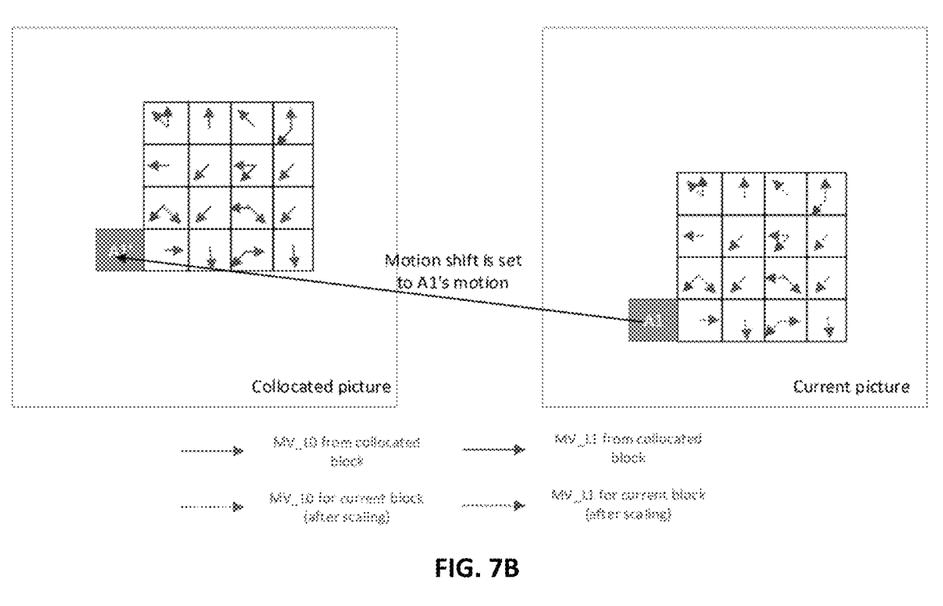
FIG. 7B is an illustration of the derivation, in SbTMVP mode, of sub-CU-level motion information by applying motion shift identified from the spatial neighboring blocks.

FIG. 7A and FIG. 7B illustrate the operation of the SbTMVP mode. SbTMVP predicts the motion vectors of the sub-CUs within the current CU in two steps. FIG. 7A illustrates the first step, where the spatial neighbors are examined in the order of A1, B1, B0 and A0. As soon as the first spatial neighboring block that has a motion vector that uses the collocated picture as its reference picture is identified, this motion vector is selected to be the motion shift to be applied. When no such motion is identified from the spatial neighbors, then the motion shift is set to (0, 0). FIG. 7B illustrates the second step, where the motion shift identified in the first step is applied (i.e. added to the current block's coordinates) to obtain sub-CU-level motion information (motion vectors and reference indices) from the collocated picture. The illustration employed in FIG. 7B shows an example where the motion shift is set to block A1's motion. Then, for each sub-CU, the motion information of its corresponding block (the smallest motion grid that covers the center sample) in the collocated picture is used to derive the motion information for the sub-CU. After the motion information of the collocated sub-CU is identified, it is converted to the motion vectors and reference indices of the current sub-CU in a similar way as the TMVP process of HEVC, where temporal motion scaling is applied to align the reference pictures of the temporal motion vectors to those of the current CU.

In the third version of VTM (VTM3), a combined sub-block based merge list which contains both SbTMVP candidate and affine merge candidates is used for the signaling of sub-block based merge mode. The SbTMVP mode is enabled or disabled by a sequence parameter set (SPS) flag. When the SbTMVP mode is enabled, the SbTMVP predictor is added as the first entry of the list of sub-block based merge candidates, and followed by the affine merge candidates. The size of sub-block based merge list is signaled in SPS and the maximum allowed size of the sub-block based merge list is fixed at 5 in VTM3. The sub-CU size used in SbTMVP is fixed to be 8×8, and as done for affine merge mode, SbTMVP mode is only applicable to the CU with both width and height are larger than or equal to 8. The encoding logic of the additional SbTMVP merge candidate is the same as for the other merge candidates, that is, for each CU in P or B slice, an additional RD check is performed to decide whether to use the SbTMVP candidate.

The now-current VVC introduced the new inter-mode coding tools, however, the long-term reference picture related constraints, which is present in HEVC and the now-current VVC for the scaling process for the derivation of spatial and temporal motion candidates, are not well defined in some of the new tools. In this disclosure, we propose several constraints related to the long-term reference pictures on the new inter-mode coding tools.

According to the present disclosure, during the operation of an inter-mode coding tool on an inter-mode coded block, a determination will be made regarding whether one or more of the reference pictures associated with an inter-mode coded block involved in the operation of the inter-mode coding tool are long-term reference pictures, and then based on the determination, constraints will be placed upon the operation of the inter-mode coding tool on the inter-mode coded block.

According to an embodiment of the present disclosure, the inter-mode coding tool comprises a generation of pair-wise average merge candidates.

In one example, when an averaged merge candidate involved in the generation of pair-wise average merge candidates is generated from a pre-defined pair of candidates comprising one reference picture which is a long-term reference picture and another reference picture which is not a long-term reference picture, the averaged merge candidate is regarded as invalid.

In the same example, during the generation of an averaged merge candidate from a pre-defined pair of candidates comprising two reference pictures which are both long-term reference pictures, the scaling process is prohibited.

According to another embodiment of the present disclosure, the inter-mode coding tool comprises BDOF and the inter-mode coded block is a bi-directional prediction block.

In one example, when the determination is made that one reference picture of the bi-directional prediction block involved in the operation of BDOF is a long-term reference picture and the other reference picture of the bi-directional prediction block involved in the operation of BDOF is not a long-term reference picture, the performance of BDOF is prohibited.

According to another embodiment of the present disclosure, the inter-mode coding tool comprises DMVR and the inter-mode coded block is a bi-directional prediction block.

In one example, when the determination is made that one reference picture of the bi-directional prediction block involved in the operation of DMVR is a long-term reference picture and the other reference picture of the bi-directional prediction block involved in the operation of DMVR is not a long-term reference picture, the performance of DMVR is prohibited.

In another example, when the determination is made that one reference picture of the bi-directional prediction block involved in the operation of DMVR is a long-term reference picture and the other reference picture of the bi-directional prediction block involved in the operation of DMVR is not a long-term reference picture, the scope of performance of DMVR is limited to that of the performance of integer-pixel DMVR.

According to another embodiment of the present disclosure, the inter-mode coding tool comprises the derivation of MMVD candidates.

In one example, when the determination is made that a motion vector candidate involved in the derivation of MMVD candidates has its motion vector pointing to a reference picture which is a long-term reference picture, the use of the motion vector candidate as a base motion vector (also known as a starting motion vector) is prohibited.

In a second example, when one reference picture of the inter-mode coded block involved in the derivation of MMVD candidates is a long-term reference picture and the other reference picture of the inter-mode coded block involved in the derivation of MMVD candidates is not a long-term reference picture, and further when the base motion vector is a bi-directional motion vector, then for the one motion vector that is pointing to the long-term reference picture and that is also contained in the bi-directional base motion vector, the modification of the one motion vector by signaled motion vector difference (MVD) is prohibited.

In the same second example, the proposed MVD modification process will be instead as shown in the block immediately following this paragraph, where the emphasized portions of the text show the proposed modification from the existing MVD modification process in the now-current VVC.

mode coded block involved in the derivation of SMVD candidates is a long-term reference picture and the other reference picture of the inter-mode coded block involved in the derivation of SMVD candidates is not a long-term reference picture, and further when the base motion vector is a bi-directional motion vector, then for the one motion vector that is pointing to the long-term reference picture and that is also contained in the bi-directional base motion vector, the modification of the one motion vector by signaled MVD is prohibited.

According to another embodiment of the present disclosure, the inter-mode coding tool comprises bi-prediction

```
When the starting MV is a bi-prediction MV, the following applies:
    currPocDiffL0 = POC difference between the current picture and the list 0 reference picture
    currPocDiffL1 = POC difference between the current picture and the list 1 reference picture
    When (-currPocDiffL0 * currPocDiffL1) is greater than 0, the following applies:
        finalMVDL0[ 0 ] = MmvdOffset [ 0 ]
        finalMVDL0[ 1 ] = MmvdOffset [ 1 ]
        finalMVDL1[ 0 ] = -MmvdOffset [ 0 ]
        finalMVDL1[ 1 ] = -MmvdOffset [ 1 ]
    Otherwise ( -currPocDiffL0 * currPocDiffL1 is less than 0 ), the following applies:
        finalMVDL0[ 0 ] = MmvdOffset [ 0 ]
        finalMVDL0[ 1 ] = MmvdOffset [ 1 ]
        finalMVDL1[ 0 ] = MmvdOffset [ 0 ]
        finalMVDL1[ 1 ] = MmvdOffset [ 1 ]
    When Abs( currPocDiffL0 ) is greater than Abs( currPocDiffL1 ) and both reference pictures are
NOT long-term reference pictures, the following applies:
        td = Clip3( -128, 127, currPocDiffL0 )
        tb = Clip3( -128, 127, currPocDiffL1 )
        tx = ( 16384 + ( Abs( td ) >> 1 ) ) / td
        distScaleFactor = Clip3( -4096, 4095, ( tb * tx + 32) >> 6 )
        finalMVDL1[ 0 ] = Clip3( -215, 215 - 1, Sign( distScaleFactor * finalMVDL1[ 0 ] ) *
            ( ( Abs( distScaleFactor * finalMVDL1[ 0 ] ) + 127) >> 8 ) )
        finalMVDL1[ 1 ] = Clip3( -215, 215 - 1, Sign( distScaleFactor * finalMVDL1[ 1 ] ) *
            ( ( Abs( distScaleFactor * finalMVDL1[ 1 ] ) + 127) >> 8 ) )
    Otherwise when Abs( currPocDiffL0 ) is less than Abs( currPocDiffL0 ) and both reference
pictures are NOT long-term reference pictures, the following applies:
        td = Clip3( -128, 127, currPocDiffL1 )
        tb = Clip3( -128, 127, currPocDiffL0 )
        tx = ( 16384 + ( Abs( td ) >> 1 ) ) / td
        distScaleFactor = Clip3( -4096, 4095, ( tb * tx + 32) >> 6 )
    finalMVDL0[ 0 ] = Clip3( -215, 215 - 1, Sign( distScaleFactor * finalMVDL0[ 0 ] ) *
            ( ( Abs( distScaleFactor * finalMVDL0 [ 0 ] ) + 127 ) >> 8 ) )
    finalMVDL0[ 1 ] = Clip3( -215, 215 - 1, Sign( distScaleFactor * finalMVDL0[ 1 ] ) *
            ( ( Abs( distScaleFactor * finalMVDL0 [ 1 ] ) + 127 ) >> 8 ) )
```

In a third example, when at least one reference picture of the inter-mode coded block involved in the derivation of MMVD candidates is a long-term reference picture, and further when the base motion vector is a bi-directional motion vector, then the scaling process in the derivation of the final MMVD candidate is prohibited.

According to one or more embodiments of the present disclosure, the inter-mode coding tool comprises the derivation of SMVD candidates.

In one example, when the determination is made that a motion vector candidate has its motion vector pointing to a reference picture which is a long-term reference picture, the use of the motion vector candidate as a base motion vector is prohibited.

In some examples, when at least one reference picture of the inter-mode coded block involved in the derivation of SMVD candidates is a long-term reference picture, and further when the base motion vector is a bi-directional motion vector, then for the one motion vector that is pointing to the long-term reference picture and that is also contained in the bi-directional base motion vector, the modification of the one motion vector by signaled MVD is prohibited. In other examples, when one reference picture of the inter-with weighted averaging and the inter-mode coded block is a bi-directional prediction block.

In one example, when the determination is made that at least one reference picture of the bi-directional prediction block involved in bi-prediction with weighted averaging is a long-term reference picture, the use of unequalled weighting is prohibited.

According to another embodiment of the present disclosure, the inter-mode coding tool comprises the derivation of motion vector candidates and the inter-mode coded block is an SbTMVP coded block.

In one example, the same restriction for the derivation of motion vector candidates on a conventional TMVP coded block is used in the derivation of motion vector candidates on an SbTMVP coded block.

In one refinement of the previous example, the restriction for the derivation of motion vector candidates to be used on both conventional TMVP coded blocks and SbTMVP coded blocks comprises, on one hand, regarding a motion vector of the temporal neighboring block as invalid if, within the two reference pictures comprising the target reference picture and the reference picture for the neighboring block, one reference picture is a long-term reference picture and the other reference picture is not a long-term reference picture, and on the other hand, when both the target reference picture and the reference picture for the neighboring block are long-term reference pictures, prohibiting the operation of scaling process on the motion vector of the temporal neighboring block, and using the motion vector of the temporal neighboring block directly as the motion vector prediction for the current block.

According to another embodiment of the present disclosure, the inter-mode coding tool comprises using an affine motion model in the derivation of motion vector candidates.

In one example, when the determination is made that the reference picture involved in the use of the affine motion model is a long-term reference picture, the use of affine motion model in the derivation of motion vector candidates is prohibited.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the implementations described in the present application. A computer program product may include a computer-readable medium.

Further, the above methods may be implemented using an apparatus that includes one or more circuitries, which include application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components. The apparatus may use the circuitries in combination with the other hardware or software components for performing the above described methods. Each module, sub-module, unit, or sub-unit disclosed above may be implemented at least partially using the one or more circuitries.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact examples described above and illustrated in the accompanying drawings, and that various modifications and changes can be made without departing from the scope thereof. It is intended that the scope of the invention only be limited by the appended claims.

According to the present disclosure, a method for video decoding comprises determining whether one or more of the reference pictures associated with an inter-mode coded block involved in a decoding process in inter prediction mode are long-term reference pictures; and constraining an operation in the decoding process in inter prediction mode on the inter-mode coded block based on the determination.

According to an embodiment of the present disclosure, the decoding process in inter prediction mode comprises a generation of pair-wise average merge candidates.

In one example, constraining the operation in the decoding process in inter prediction mode on the inter-mode coded block based on the determination comprises: regarding an averaged merge candidate as invalid when determining that the averaged merge candidate is generated from a pre-defined pair of candidates comprising one reference picture which is a long-term reference picture and another reference picture which is not a long-term reference picture; and prohibiting the scaling process during the generation of an averaged merge candidate from a pre-defined pair of candidates comprising two reference pictures which are both long-term reference pictures.

According to an embodiment of the present disclosure, the decoding process in inter prediction mode comprises bi-directional optical flow (BDOF) process and the inter-mode coded block is a bi-directional prediction block.

In one example, constraining the operation in the decoding process in inter prediction mode on the inter-mode coded block based on the determination comprises: prohibiting the performance of BDOF when determining that one reference picture of the bi-directional prediction block is a long-term reference picture and the other reference picture of the bi-directional prediction block is not a long-term reference picture.

According to an embodiment of the present disclosure, the decoding process in inter prediction mode comprises decoder-side motion vector refinement (DMVR) process and the inter-mode coded block is a bi-directional prediction block.

In one example, constraining the operation in the decoding process in inter prediction mode on the inter-mode coded block based on the determination comprises: prohibiting the performance of DMVR when determining that one reference picture of the bi-directional prediction block is a long-term reference picture and the other reference picture of the bi-directional prediction block is not a long-term reference picture.

In another example, constraining the operation in the decoding process in inter prediction mode on the inter-mode coded block based on the determination comprises: limiting the scope of performance of DMVR to that of the performance of integer-pixel DMVR when determining that one reference picture of the bi-directional prediction block is a long-term reference picture and the other reference picture of the bi-directional prediction block is not a long-term reference picture.

According to an embodiment of the present disclosure, the decoding process in inter prediction mode comprises the derivation process for merge mode with motion vector differences (MMVD) candidates.

In one example, constraining the operation in the decoding process in inter prediction mode on the inter-mode coded block based on the determination comprises: prohibiting the use of a motion vector candidate as a base motion vector when determining that the motion vector candidate has its motion vector pointing to a reference picture which is a long-term reference picture.

In another example, constraining the operation in the decoding process in inter prediction mode on the inter-mode coded block based on the determination comprises: when at least one reference picture of the inter-mode coded block is a long-term reference picture, and further when the base motion vector is a bi-directional motion vector, prohibiting the modification by signaled motion vector difference (MVD) of the one motion vector that is pointing to the long-term reference picture and that is also contained in the bi-directional base motion vector.

In another example, constraining the operation in the decoding process in inter prediction mode on the inter-mode coded block based on the determination comprises: when at least one reference picture of the inter-mode coded block is a long-term reference picture, and further when the base motion vector is a bi-directional motion vector, prohibiting the scaling process in the derivation of the final MMVD candidate.

According to an embodiment of the present disclosure, the decoding process in inter prediction mode comprises the decoding process for symmetric motion vector difference (SMVD) candidates.

In one example, constraining the operation in the decoding process in inter prediction mode on the inter-mode coded block based on the determination comprises: prohibiting the use of a motion vector candidate as a base motion vector when determining that the motion vector candidate has its motion vector pointing to a reference picture which is a long-term reference picture.

In another example, constraining the operation in the decoding process in inter prediction mode on the inter-mode coded block based on the determination comprises: when at least one reference picture of the inter-mode coded block is a long-term reference picture, and further when the base motion vector is a bi-directional motion vector, prohibiting the modification by signaled MVD of the one motion vector that is pointing to the long-term reference picture and that is also contained in the bi-directional base motion vector.

According to an embodiment of the present disclosure, the decoding process in inter prediction mode comprises bi-prediction with weighted averaging and the inter-mode coded block is a bi-directional prediction block.

In one example, constraining the operation in the decoding process in inter prediction mode on the inter-mode coded block based on the determination comprises: prohibiting the use of unequalled weighting when determining that at least one reference picture of the bi-directional prediction block is a long-term reference picture.

According to an embodiment of the present disclosure, the decoding process in inter prediction mode comprises the derivation process for motion vector candidates and the inter-mode coded block is a subblock-based temporal motion vector prediction (SbTMVP) coded block.

In one example, constraining the operation in the decoding process in inter prediction mode on the inter-mode coded block based on the determination comprises: using the same restriction for the derivation process for motion vector candidates on a conventional temporal motion vector prediction (TMVP) coded block in the derivation process for motion vector candidates on an SbTMVP coded block.

In another example, the restriction for the derivation process for motion vector candidates to be used on both conventional TMVP coded blocks and SbTMVP coded blocks comprises: regarding a motion vector of the temporal neighboring block as invalid if, within the two reference pictures comprising the target reference picture and the reference picture for the temporal neighboring block, one reference picture is a long-term reference picture and the other reference picture is not a long-term reference picture.

In another example, the restriction for the derivation process for motion vector candidates to be used on both conventional TMVP coded blocks and SbTMVP coded blocks comprises: when both the target reference picture and the reference picture for the temporal neighboring block are long-term reference pictures, prohibiting the operation of scaling process on the motion vector of the temporal neighboring block, and using the motion vector of the temporal neighboring block directly as the motion vector prediction for the current block.

According to an embodiment of the present disclosure, the decoding process in inter prediction mode comprises using an affine motion model in the derivation of motion vector candidates.

In one example, wherein constraining the operation in the decoding process in inter prediction mode on the inter-mode coded block based on the determination comprises: prohibiting the use of affine motion model in the derivation of motion vector candidates when determining that the reference picture involved in the use of the affine motion model is a long-term reference picture.

According to the present disclosure, a computing device comprises: one or more processors; a non-transitory storage coupled to the one or more processors; and a plurality of programs stored in the non-transitory storage that, when executed by the one or more processors, cause the computing device to perform acts comprising: determining whether one or more of the reference pictures associated with an inter-mode coded block involved in a decoding process in inter prediction mode are long-term reference pictures; and constraining an operation in the decoding process in inter prediction mode on the inter-mode coded block based on the determination.

According to an embodiment of the present disclosure, the decoding process in inter prediction mode comprises a generation of pair-wise average merge candidates.

In one example, constraining the operation in the decoding process in inter prediction mode on the inter-mode coded block based on the determination comprises: regarding an averaged merge candidate as invalid when determining that the averaged merge candidate is generated from a pre-defined pair of candidates comprising one reference picture which is a long-term reference picture and another reference picture which is not a long-term reference picture; and prohibiting the scaling process during the generation of an averaged merge candidate from a pre-defined pair of candidates comprising two reference pictures which are both long-term reference pictures.

According to an embodiment of the present disclosure, the decoding process in inter prediction mode comprises BDOF process and the inter-mode coded block is a bi-directional prediction block.

In one example, constraining the operation in the decoding process in inter prediction mode on the inter-mode coded block based on the determination comprises: prohibiting the performance of BDOF when determining that one reference picture of the bi-directional prediction block is a long-term reference picture and the other reference picture of the bi-directional prediction block is not a long-term reference picture.

According to an embodiment of the present disclosure, the decoding process in inter prediction mode comprises DMVR process and the inter-mode coded block is a bi-directional prediction block.

In one example, constraining the operation in the decoding process in inter prediction mode on the inter-mode coded block based on the determination comprises: prohibiting the performance of DMVR when determining that one reference picture of the bi-directional prediction block is a long-term reference picture and the other reference picture of the bi-directional prediction block is not a long-term reference picture.

In another example, constraining the operation in the decoding process in inter prediction mode on the inter-mode coded block based on the determination comprises: limiting the scope of performance of DMVR to that of the performance of integer-pixel DMVR when determining that one reference picture of the bi-directional prediction block is a long-term reference picture and the other reference picture of the bi-directional prediction block is not a long-term reference picture.

According to an embodiment of the present disclosure, the decoding process in inter prediction mode comprises the derivation process for MMVD candidates.

In one example, constraining the operation in the decoding process in inter prediction mode on the inter-mode coded block based on the determination comprises: prohibiting the use of a motion vector candidate as a base motion vector when determining that the motion vector candidate has its motion vector pointing to a reference picture which is a long-term reference picture.

In another example, constraining the operation in the decoding process in inter prediction mode on the inter-mode coded block based on the determination comprises: when at least one reference picture of the inter-mode coded block is a long-term reference picture, and further when the base motion vector is a bi-directional motion vector, prohibiting the modification by signaled MVD of the one motion vector that is pointing to the long-term reference picture and that is also contained in the bi-directional base motion vector.

In another example, constraining the operation in the decoding process in inter prediction mode on the inter-mode coded block based on the determination comprises: when at least one reference picture of the inter-mode coded block is a long-term reference picture, and further when the base motion vector is a bi-directional motion vector, prohibiting the scaling process in the derivation of the final MMVD candidate.

According to an embodiment of the present disclosure, the decoding process in inter prediction mode comprises the decoding process for SMVD candidates.

In one example, constraining the operation in the decoding process in inter prediction mode on the inter-mode coded block based on the determination comprises: prohibiting the use of a motion vector candidate as a base motion vector when determining that the motion vector candidate has its motion vector pointing to a reference picture which is a long-term reference picture.

In another example, constraining the operation in the decoding process in inter prediction mode on the inter-mode coded block based on the determination comprises: when at least one reference picture of the inter-mode coded block is a long-term reference picture, and further when the base motion vector is a bi-directional motion vector, prohibiting the modification by signaled MVD of the one motion vector that is pointing to the long-term reference picture and that is also contained in the bi-directional base motion vector.

According to an embodiment of the present disclosure, the decoding process in inter prediction mode comprises bi-prediction with weighted averaging and the inter-mode coded block is a bi-directional prediction block.

In one example, constraining the operation in the decoding process in inter prediction mode on the inter-mode coded block based on the determination comprises: prohibiting the use of unequalled weighting when determining that at least one reference picture of the bi-directional prediction block is a long-term reference picture.

According to an embodiment of the present disclosure, the decoding process in inter prediction mode comprises the derivation process for motion vector candidates and the inter-mode coded block is an SbTMVP coded block.

In one example, constraining the operation in the decoding process in inter prediction mode on the inter-mode coded block based on the determination comprises: using the same restriction for the derivation process for motion vector candidates on a conventional TMVP coded block in the derivation process for motion vector candidates on an SbTMVP coded block.

In another example, the restriction for the derivation process for motion vector candidates to be used on both conventional TMVP coded blocks and SbTMVP coded blocks comprises: regarding a motion vector of the temporal neighboring block as invalid if, within the two reference pictures comprising the target reference picture and the reference picture for the temporal neighboring block, one reference picture is a long-term reference picture and the other reference picture is not a long-term reference picture.

In another example, the restriction for the derivation process for motion vector candidates to be used on both conventional TMVP coded blocks and SbTMVP coded blocks comprises: when both the target reference picture and the reference picture for the temporal neighboring block are long-term reference pictures, prohibiting the operation of scaling process on the motion vector of the temporal neighboring block, and using the motion vector of the temporal neighboring block directly as the motion vector prediction for the current block.

According to an embodiment of the present disclosure, the decoding process in inter prediction mode comprises using an affine motion model in the derivation of motion vector candidates.

In one example, constraining the operation in the decoding process in inter prediction mode on the inter-mode coded block based on the determination comprises: prohibiting the use of affine motion model in the derivation of motion vector candidates when determining that the reference picture involved in the use of the affine motion model is a long-term reference picture.

According to the present disclosure, a non-transitory computer readable storage medium stores a plurality of programs for execution by a computing device having one or more processors, wherein the plurality of programs, when executed by the one or more processors, cause the computing device to perform acts comprising: determining whether one or more of the reference pictures associated with an inter-mode coded block involved in a decoding process in inter prediction mode are long-term reference pictures; and constraining an operation in the decoding process in inter prediction mode on the inter-mode coded block based on the determination.

According to an embodiment of the present disclosure, the decoding process in inter prediction mode comprises a generation of pair-wise average merge candidates.

In one example, constraining the operation in the decoding process in inter prediction mode on the inter-mode coded block based on the determination comprises: regarding an averaged merge candidate as invalid when determining that the averaged merge candidate is generated from a pre-defined pair of candidates comprising one reference picture which is a long-term reference picture and another reference picture which is not a long-term reference picture; and prohibiting the scaling process during the generation of an averaged merge candidate from a pre-defined pair of candidates comprising two reference pictures which are both long-term reference pictures.

According to an embodiment of the present disclosure, the decoding process in inter prediction mode comprises BDOF process and the inter-mode coded block is a bi-directional prediction block.

In one example, constraining the operation in the decoding process in inter prediction mode on the inter-mode coded block based on the determination comprises: prohibiting the performance of BDOF in response to determining that one reference picture of the bi-directional prediction block is a long-term reference picture and the other reference picture of the bi-directional prediction block is not a long-term reference picture.

According to an embodiment of the present disclosure, the decoding process in inter prediction mode comprises DMVR process and the inter-mode coded block is a bi-directional prediction block.

In one example, constraining the operation in the decoding process in inter prediction mode on the inter-mode coded block based on the determination comprises: prohibiting the performance of DMVR in response to determining that one reference picture of the bi-directional prediction block is a long-term reference picture and the other reference picture of the bi-directional prediction block is not a long-term reference picture.

In another example, constraining the operation in the decoding process in inter prediction mode on the inter-mode coded block based on the determination comprises: limiting the scope of performance of DMVR to that of the performance of integer-pixel DMVR in response to determining that one reference picture of the bi-directional prediction block is a long-term reference picture and the other reference picture of the bi-directional prediction block is not a long-term reference picture.

According to an embodiment of the present disclosure, the decoding process in inter prediction mode comprises the derivation process for MMVD candidates.

In one example, constraining the operation in the decoding process in inter prediction mode on the inter-mode coded block based on the determination comprises: prohibiting the use of a motion vector candidate as a base motion vector in response to determining that the motion vector candidate has its motion vector pointing to a reference picture which is a long-term reference picture.

In another example, constraining the operation in the decoding process in inter prediction mode on the inter-mode coded block based on the determination comprises: when at least one reference picture of the inter-mode coded block is a long-term reference picture, and further when the base motion vector is a bi-directional motion vector, prohibiting the modification by signaled MVD of the one motion vector that is pointing to the long-term reference picture and that is also contained in the bi-directional base motion vector.

In another example, constraining the operation in the decoding process in inter prediction mode on the inter-mode coded block based on the determination comprises: when at least one reference picture of the inter-mode coded block is a long-term reference picture, and further when the base motion vector is a bi-directional motion vector, prohibiting the scaling process in the derivation of the final MMVD candidate.

According to an embodiment of the present disclosure, the decoding process in inter prediction mode comprises the decoding process for SMVD candidates.

In one example, constraining the operation in the decoding process in inter prediction mode on the inter-mode coded block based on the determination comprises: prohibiting the use of a motion vector candidate as a base motion vector in response to determining that the motion vector candidate has its motion vector pointing to a reference picture which is a long-term reference picture.

In another example, constraining the operation in the decoding process in inter prediction mode on the inter-mode coded block based on the determination comprises: when at least one reference picture of the inter-mode coded block is a long-term reference picture, and further when the base motion vector is a bi-directional motion vector, prohibiting the modification by signaled MVD of the one motion vector that is pointing to the long-term reference picture and that is also contained in the bi-directional base motion vector.

According to an embodiment of the present disclosure, the decoding process in inter prediction mode comprises bi-prediction with weighted averaging and the inter-mode coded block is a bi-directional prediction block.

In one example, constraining the operation in the decoding process in inter prediction mode on the inter-mode coded block based on the determination comprises: prohibiting the use of unequalled weighting in response to determining that at least one reference picture of the bi-directional prediction block is a long-term reference picture.

According to an embodiment of the present disclosure, the decoding process in inter prediction mode comprises the derivation process for motion vector candidates and the inter-mode coded block is an SbTMVP coded block.

In one example, constraining the operation in the decoding process in inter prediction mode on the inter-mode coded block based on the determination comprises: using the same restriction for the derivation process for motion vector candidates on a conventional TMVP coded block in the derivation process for motion vector candidates on an SbTMVP coded block.

In another example, the restriction for the derivation process for motion vector candidates to be used on both conventional TMVP coded blocks and SbTMVP coded blocks comprises: regarding a motion vector of the temporal neighboring block as invalid if, within the two reference pictures comprising the target reference picture and the reference picture for the temporal neighboring block, one reference picture is a long-term reference picture and the other reference picture is not a long-term reference picture.

In another example, the restriction for the derivation process for motion vector candidates to be used on both conventional TMVP coded blocks and SbTMVP coded blocks comprises: when both the target reference picture and the reference picture for the temporal neighboring block are long-term reference pictures, prohibiting the operation of scaling process on the motion vector of the temporal neighboring block, and using the motion vector of the temporal neighboring block directly as the motion vector prediction for the current block.

According to an embodiment of the present disclosure, the decoding process in inter prediction mode comprises using an affine motion model in the derivation of motion vector candidates.

In one example, constraining the operation in the decoding process in inter prediction mode on the inter-mode coded block based on the determination comprises: prohibiting the use of affine motion model in the derivation of motion vector candidates in response to determining that the reference picture involved in the use of the affine motion model is a long-term reference picture.

According to the present disclosure, a computer program product comprises a computer-readable medium storing instructions, wherein, when the instructions are executed by a processor, the instructions cause the processor to perform the method for video decoding.

We claim:

1. A method for video decoding, comprising:

determining whether one or more of a plurality of reference pictures associated with an inter-mode coded block involved in an operation of an inter-mode coding tool are long-term reference pictures; and prohibiting the performance of the inter-mode coding tool on the inter-mode coded block based on the determining that one of two reference pictures of the inter-mode coded block is a long-term reference picture and the other is not a long-term reference picture, wherein the inter-mode coding tool comprises one of bi-directional optical flow (BDOF) process or decoder-side motion vector refinement (DMVR) process, and wherein the inter-mode coded block is a bi-directional prediction block.

2. The method of claim 1, wherein prohibiting the performance of the inter-mode coding tool on the inter-mode coded block comprises:

prohibiting the performance of BDOF in response to determining that one reference picture of the bi-directional prediction block is a long-term reference picture and the other reference picture of the bi-directional prediction block is not a long-term reference picture.

3. The method of claim 1, wherein prohibiting the performance of the inter-mode coding tool on the inter-mode coded block comprises:

prohibiting the performance of DMVR in response to determining that one reference picture of the bi-directional prediction block is a long-term reference picture and the other reference picture of the bi-directional prediction block is not a long-term reference picture.

4. A computing device comprising:

one or more processors;

a non-transitory storage coupled to the one or more processors; and a plurality of programs stored in the non-transitory storage that, when executed by the one or more processors, cause the computing device to store a bitstream and perform acts based on the bitstream, the acts comprising:

determining whether one or more of a plurality of reference pictures associated with an inter-mode coded block involved in an operation of an inter-mode coding tool are long-term reference pictures; and prohibiting the performance of the inter-mode coding tool on the inter-mode coded block based on the determining that one of two reference pictures of the inter-mode coded block is a long-term reference picture and the other is not a long-term reference picture, wherein the inter-mode coding tool comprises one of bi-directional optical flow (BDOF) process or decoder-side motion vector refinement (DMVR) process, and wherein the inter-mode coded block is a bi-directional prediction block.

5. The computing device of claim 4, wherein the inter-mode coding tool comprises BDOF process;

wherein prohibiting the performance of the inter-mode coding tool on the inter-mode coded block comprises:

prohibiting the performance of BDOF in response to determining that one reference picture of the bi-directional prediction block is a long-term reference picture and the other reference picture of the bi-directional prediction block is not a long-term reference picture.

6. The computing device of claim 4, wherein the inter-mode coding tool comprises DMVR process;

wherein prohibiting the performance of the inter-mode coding tool on the inter-mode coded block comprises:

prohibiting the performance of DMVR in response to determining that one reference picture of the bi-directional prediction block is a long-term reference picture and the other reference picture of the bi-directional prediction block is not a long-term reference picture.

7. A non-transitory computer readable storage medium storing a bitstream to be decoded by performing acts comprising:

determining whether one or more of a plurality of reference pictures associated with an inter-mode coded block involved in an operation of an inter-mode coding tool are long-term reference pictures; and prohibiting the performance of the inter-mode coding tool on the inter-mode coded block based on the determining that one of two reference pictures of the inter-mode coded block is a long-term reference picture and the other is not a long-term reference picture, wherein the inter-mode coding tool comprises one of bi-directional optical flow (BDOF) process or decoder-side motion vector refinement (DMVR) process, and wherein the inter-mode coded block is a bi-directional prediction block.

8. The non-transitory computer readable storage medium of claim 7, wherein the decoding process in inter prediction mode comprises BDOF process;

wherein prohibiting the performance of the inter-mode coding tool on the inter-mode coded block comprises:

prohibiting the performance of BDOF in response to determining that one reference picture of the bi-directional prediction block is a long-term reference picture and the other reference picture of the bi-directional prediction block is not a long-term reference picture.

9. The non-transitory computer readable storage medium of claim 7, wherein the inter-mode coding tool comprises DMVR process;

wherein prohibiting the performance of the inter-mode coding tool on the inter-mode coded block comprises:

prohibiting the performance of DMVR in response to determining that one reference picture of the bi-directional prediction block is a long-term reference picture and the other reference picture of the bi-directional prediction block is not a long-term reference picture.

* * * * *